United States Patent [19]

Furuno et al.

[11] Patent Number: 4,819,174

[45] Date of Patent: Apr. 4, 1989

[54] ROAD NAVIGATION SYSTEM

[75] Inventors: Kenichi Furuno; Yoshio Tooko; Takayuki Nonami, all of Hyogo, Japan

[73] Assignee: Mitsubishi Denki Kabushiki Kaisha, Tokyo, Japan

[21] Appl. No.: 8,573

[22] Filed: Jan. 29, 1987

[30] Foreign Application Priority Data

Jun. 9, 1986 [JP] Japan ................................ 61-133414

[51] Int. Cl.[4] ................................................ G06F 15/50

[52] U.S. Cl. ..................................... 364/444; 364/449; 340/988; 340/991; 340/995

[58] Field of Search ................ 364/424, 443, 444, 449, 364/460, 461; 340/988, 989, 990, 993, 995

[56] References Cited

U.S. PATENT DOCUMENTS

| | | | |
|---|---|---|---|
| 3,899,671 | 8/1975 | Stover | 364/461 |
| 4,092,718 | 5/1978 | Wendt | 340/989 |
| 4,515,994 | 5/1985 | Bolle et al. | 179/2 R |
| 4,608,656 | 8/1986 | Tanaka et al. | 364/449 |
| 4,660,037 | 4/1987 | Nakamura | 364/449 |
| 4,663,629 | 5/1987 | Tagami et al. | 364/449 |
| 4,701,760 | 10/1987 | Raoux | 340/993 |

*Primary Examiner*—Gary Chin

*Attorney, Agent, or Firm*—Wolf, Greenfield & Sacks

[57] ABSTRACT

A road navigation system comprises a plurality of guidance information transmitter systems disposed along a route, each transmitter system generating current location information in the form of extremely-low-powered electric waves, and a guidance signal generator system for providing guidance information for the benefit of a user. The guidance signal generator system comprises a receiver unit for receiving the current location information from the guidance information transmitter system, an input unit for inputting destination information, a memory unit for storing available map information and the inputted destination information which can be prepared as route information to be traced, a data processor unit for comparing the route information with the current location information received by the receiver unit and for producing the guidance information, and an output unit for communicating the guidance information to the user. The guidance signal generator system can provide the user with accurate guidance information within a relatively small area covered by the low-powered electric waves from the transmitter system.

8 Claims, 3 Drawing Sheets

ROAD NAVIGATION SYSTEM

BACKGROUND OF THE INVENTION

1. Field of the Invention

The present invention relates to a radio communication and data processing system for a vehicle and, in particular, to a road navigation system or an automatic drive guidance system for an automobile or the like.

2. Prior Art

FIG. 1 shows a block diagram of a conventional road navigation system as disclosed, for example, in Japanese Patent Public Disclosure (KOKAI) No. 57-206813 in 1983. In the drawing, numeral 1 denotes a display unit, numeral 2 denotes a CPU, numeral 3 denotes a location information unit, numeral 4 denotes a RAM, numeral 5 denotes an orientation sensor, numeral 6 denotes a velocity sensor, and numeral 7 denotes an output unit.

In operation, the display unit 1 visually displays a road map which a vehicle driver may wish to refer to. By means of the location information input unit 3, a screen marker is traced from a departure point to a destination point on the display unit 1, so that information on a course or route which it is intended to follow is stored in the RAM 4. Then, the marker is set at the departure point when the journey is started. During the journey, the current location of the vehicle at any one time can be computed by the CPU 2 in accordance with information provided by the orientation sensor 5 and the velocity sensor 6 and the marker on the display unit 1 is moved on this basis. Also, by means of the CPU 2, the computed current location information can be compared with the intended course or route information stored in the RAM 4 to determine whether the vehicle is exactly on course. If it is off course, an alarm indication, or a guidance message indicating, for example, which way the driver should turn at the next road crossing or intersection can be provided from the output unit 7 which may include a loudspeaker.

Since the conventional road navigation system is constituted in the manner described above, it is difficult to accurately obtain the current location information due to signal errors caused by the orientation sensor and the velocity sensor. Therefore, this system has shown a tendency to give wrong guidance or indications to the vehicle driver.

SUMMARY OF THE INVENTION

The disadvantage or problem described above can be overcome by the present invention.

It is an object of the present invention, therefore, to provide an improved road navigation system capable of presenting accurate guidance information to a user.

Another object of the present invention is to provide an improved road navigation or guidance system which is preferably applied to a vehicle or an automobile.

A still further object of the present invention is to provide a road navigation system comprising a plurality of guidance information transmitter systems disposed along a route, each transmitter system generating current location information in the form of extremely-low-powered electric waves, and a guidance signal generator system for providing guidance information for the benefit of a user, which comprises a receiver unit for receiving the current location information from the guidance information transmitter system, an input unit for inputting destination information, a memory unit for storing available map information and the inputted destination information which can be prepared as course information to be traced, a data processor unit for comparing the course information with the current location information received by the receiver unit and for producing the guidance information, and an output unit for informing the user of the guidance information.

According to the present invention, a plurality of guidance information transmitter systems are provided for generating the current location information of a vehicle or the like in the form of low-powered electric waves, each of which may be disposed at an appropriate point at the side of a road, for example, near a road intersection or a tollgate of a free way. In this way, the guidance signal generator system can give the user accurate guidance information within a relatively small area covered by the low-powered electric waves from the transmitter system.

Also, according to the present invention, since the respective guidance information transmitter systems can each be constituted in the same manner, it is expected that it will be possible to produce them in a mass production process and to thereby reduce the cost of production.

BRIEF DESCRIPTION OF THE DRAWINGS

The foregoing and other objects, features and advantages of the present invention will be more fully understood from the following detailed explanation read together with the accompanying drawings, wherein.

PREFERRED EMBODIMENTS OF THE INVENTION

Figure 1:
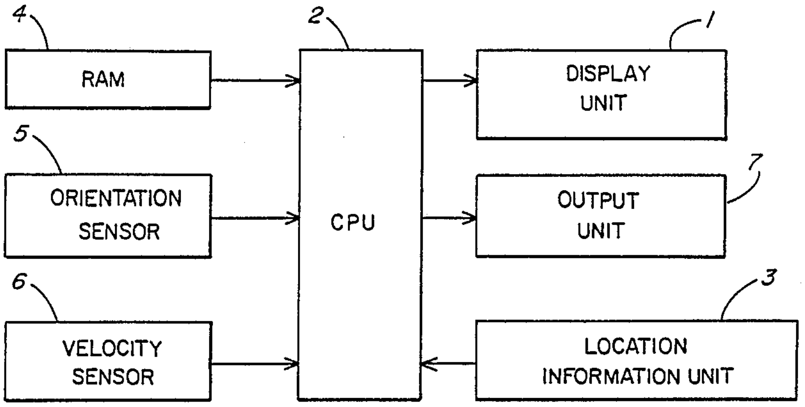
FIG. 1 (PRIOR ART)
FIG. 1 shows a block diagram of a road navigation system, in accordance with a prior art.
Figure 2:
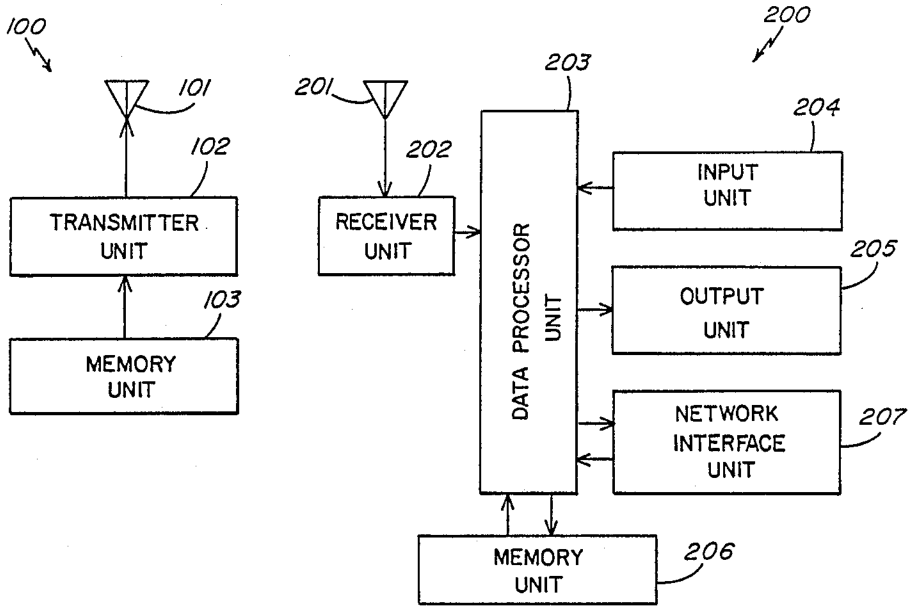
FIG. 2 shows a block diagram of a road navigation system in accordance with the present invention.

Referring now to FIG. 2, there is shown an embodiment of the present invention. In the drawing, numeral 100 denotes one of a number of guidance information transmitter systems which are disposed near various principal road intersections and the like, the transmitter systems comprising an antenna 101, a transmitter unit 102 which is preferably driven by extremely low electric power, and a memory unit 103 for storing information associated with the current location of a vehicle. More specifically, the memory unit 103 may store the location information of the given transmitter system (in the form of coded information signaling where that particular location is) and the current location information for a particular customer or subscriber (a coded signal indicating, for example, drive X [Km] straight from the current point to YY Golf Country Club).

Numeral 200 denotes a guidance signal generator system which may be provided in a vehicle such as an automobile. The generator system 200 comprises an antenna 201, a receiver unit 202, a data processor unit 203 for processing various data in accordance with predetermined rules, an input unit 204 for inputting destination information required by a driver, an output unit 205 for signaling guidance information to the driver, and a memory unit 206 for storing information regarding a road map and so on, in addition to the destination information.

In this arrangement, the data processor unit 203 is designed to receive the destination information from the input unit 204, the pre-stored map information in the memory unit 206 and the current location information transmitted from the guidance information transmitter system 100, and to thereby produce guidance information associated with a course which is to be later taken, so that the driver can be advised of the guidance information by means of the output unit 205.

The map information includes information which is to be given to the driver, for example, information defining a point where the driver is located on the map when the current location information is specified or received by the receiver unit 202, and information relative to an intersection preceding the current location, by means of which the driver will be oriented.

In operation, current location signals in the form of extremely low-powered radio waves are continuously emitted from the guidance information transmitter system 100 which is disposed near one of the plurality of road intersections, and then are caught by the vehicle-carried system or guidance signal generator system 200 when it passes by that intersection.

In the vehicle-carried system 200, the map information is previously stored in the memory 206 and, prior to or at the time of departure, the destination information is also stored therein. During the trip, each time the vehicle passes an intersection where the transmitter system 100 is disposed, the current location information emitted by the system 100 is received by the receiver unit 202. Then, the received information is analyzed and compared with both the map information and the destination information from the memory 206 so as to produce guidance information representative of the route from the current point to the destination point. As a result, guidance information can be provided for the driver by means of the output unit 205.

A more detailed explanation will now be given.

Assuming that the driver plans to drive his vehicle from point A via point B to point C, such departure and destination information (A, B and C) is inputted by means of the input unit 204.

In the data processor unit 203, the inputted destination information is compared with the map information which has been stored in the memory 206, thereby producing route information which is stored in the memory for subsequent utilization, prior to departure. As the vehicle proceeds, each time it passes an intersection, the current location information from that transmitter system 100 is received by the receiver unit 202 and then is referred to the stored route information in the processor unit 203 to determine the point where the vehicle is currently located. Thus, information including map information as to the determined point, which is useful in guiding the driver to the intended point or destination, can be provided for the driver.

If the vehicle deviates from the initially intended course, the current location information can no longer be referenced to the stored route information, so that the course information is revised or corrected by utilizing the current location information in accordance with the procedure performed at the time of departure, as described above, and then the corrected route information is newly stored in the memory 206. The corrected route information will be referred to when the next current location information is received.

By designating the route information with a uniquely coded number or an ID signal assigned to the subscriber, additional information which is received simultaneously with the current location information can also be given to the driver or the subscriber.

The procedure by which the guidance information, of which the driver is informed, is produced from the map information, the destination information and the current location information will next be explained.

With the destination information being designated or known, the data processor unit 203 operates to determine the course which can be selected from the stored map information, taking into consideration the following factors. An optional course can be selected by satisfying several driving conditions; for example, the total distance of the journey should be minimized, the roads along the route should be as wide as possible, and the route should be such as to enable the vehicle to be driven at an actual speed exceeding a predetermined value (or the course should be selected to avoid any traffic jams).

Under the control of the data processor unit 203, the course information is stored in the memory 206 and then is compared with the current location information each time the vehicle passes an intersection, thereby producing guidance information indicating a point where the vehicle is travelling. If, for example, the vehicle passes an Nth intersection on a road selected by the route information A, the guidance information for subsequent travel, such as "Turn left at the (N+1)th intersection" or "After turning left, go straight for X [Km]", can be generated in the form of a coding signal and, at an appropriate time, be communicated by means of an artificial sound to the driver. It is to be noted that the kinds of artificial sounds which can be produced must be reasonable in number because of the limited number of coded signals.

Although one preferred embodiment has been described herein, it will be apparent to those skilled in the art that numerous modifications and substitutions may be made within the scope of the invention.

In particular, although the embodiment above has been explained with respect to a system of the type in which the route information can be produced and/or corrected by the map information and the destination information, both of which are prepared on the vehicle side, and the current location information which is transmitted from the guidance information transmitter system located at the individual intersections, and is received by the receiver unit of the guidance signal generator system whereby the guidance information for the driver can be produced, it will now be apparent that it is also possible to provide a road navigation system of the type in which the course information is prepared on the transmitter side, such as at a guidance information center, in response to destination information requested by a driver through a communication medium such as, for example, a radio telephone system (see FIG. 3), or a wired telephone system (see FIG. 4) or the like, the requested route information being received at the receiver side through the communication medium to produce the relevant guidance information.

Figure 3:
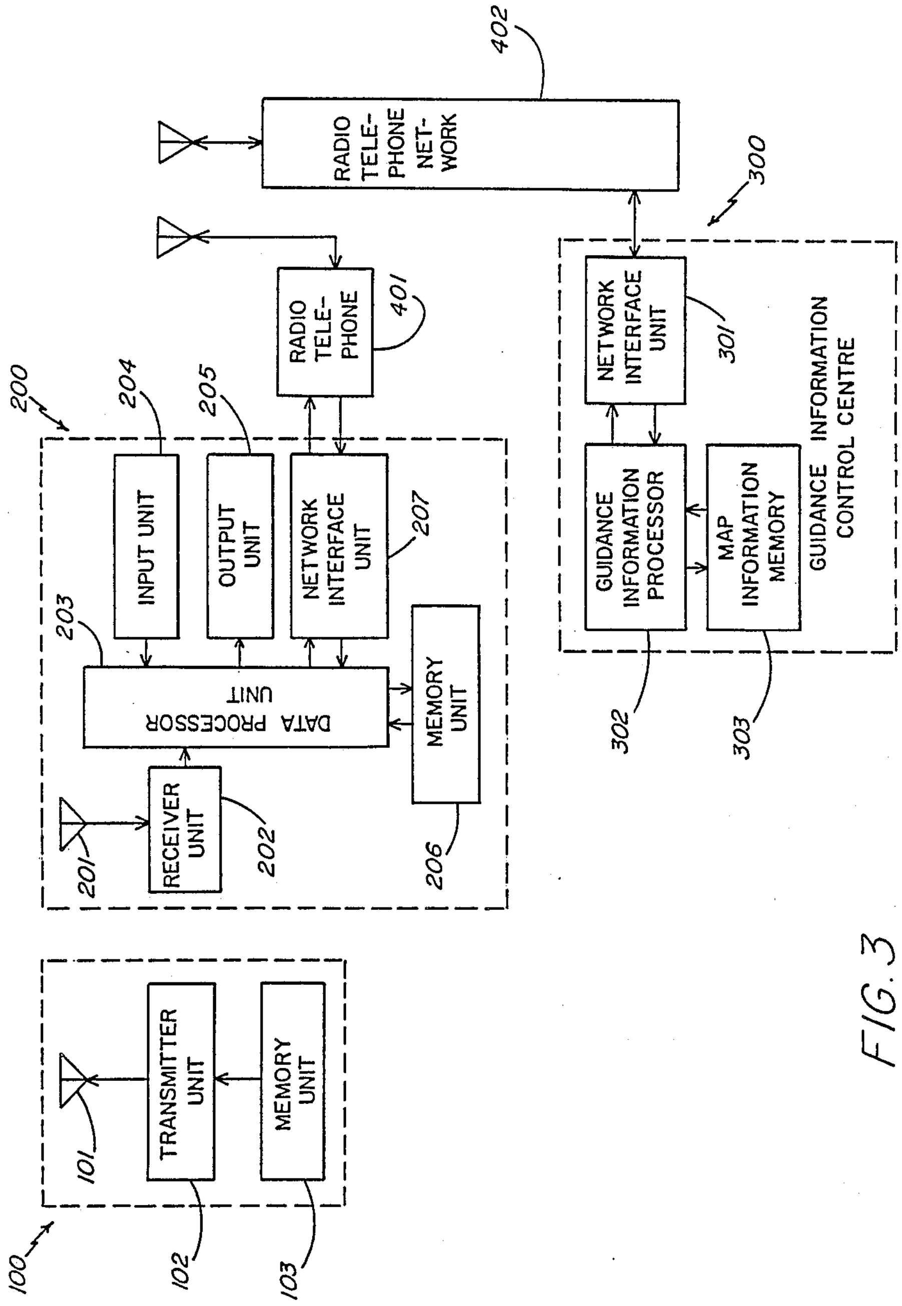
FIG. 3 shows a block diagram of an alternate embodiment of the invention employing a guidance information center and a radio telephone system for signal communication.
Figure 4:
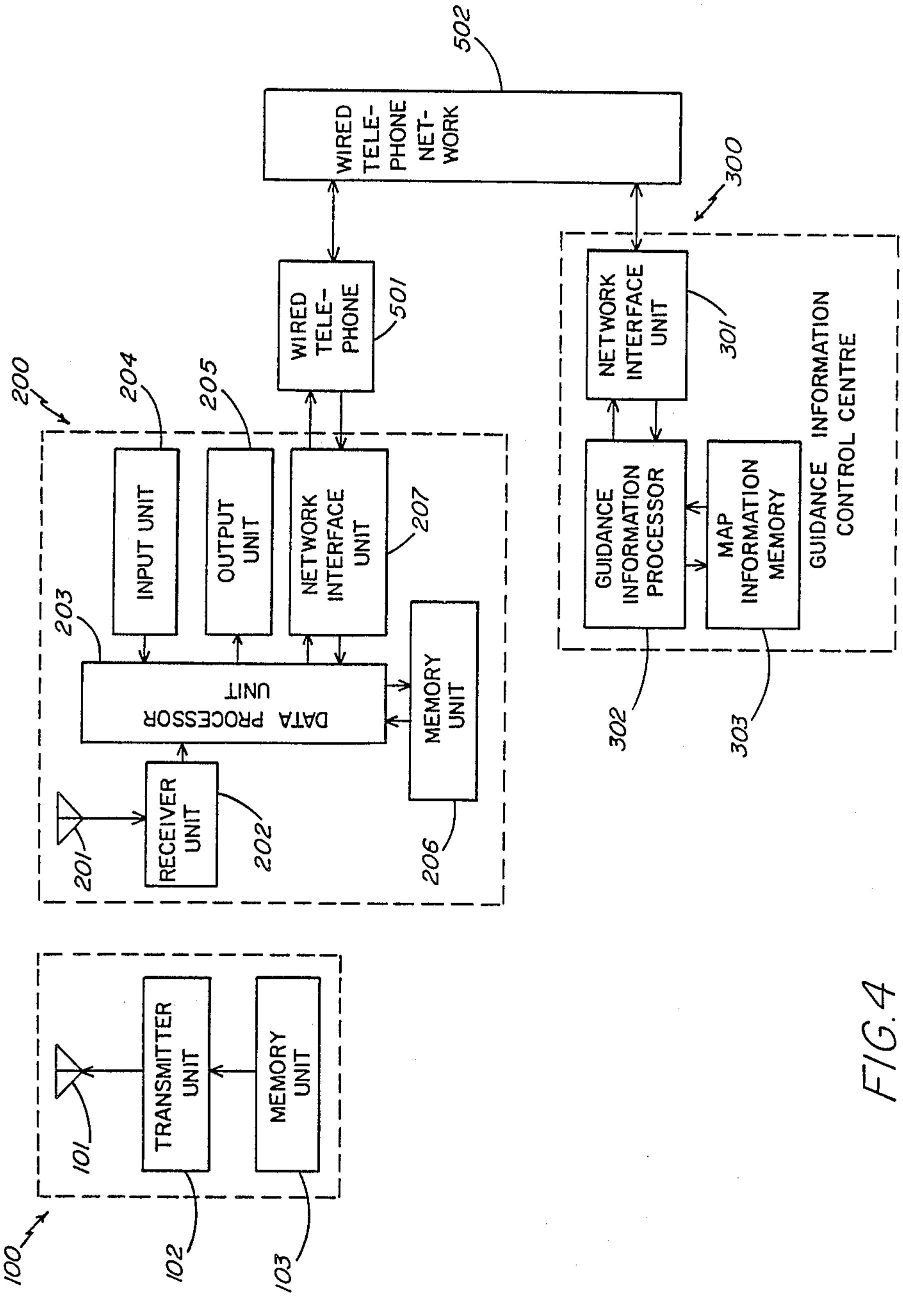
FIG. 4 shows a block diagram of a further alternate embodiment of the invention employing a guidance information center and a wired telephone system for signal communication.

For the purpose of signal communication with the data processor unit 203, as indicated in FIGS. 2-4, there is provided a network interface unit 207. FIG. 3 shows the network interface unit 207 coupling to a radio telephone system including unit 401 and corresponding network 402 that in turn connects to the guidance information control center 300. Similarly, in FIG. 4 the network interface unit 207 couples to a wired telephone system including unit 501 and the wired telephone network 502 which in turn connects to the guidance information control center 300. In both embodiments of FIGS. 3 and 4, the guidance information control center 300 has means (map information memory 303) for storing the map information and means (network interface unit 301 and guidance information processor 302) for communicating between the guidance signal generator means and the guidance information control center.

It would also be possible to provide a system of the type in which route information stored in an IC card is available for the driver and, in a case where a plurality of destinations are selected by the driver in sequence within a relatively small area, the route information is stored in the IC card in the form of a plurality of switchable sections and thus the map information relative to such small area is used in common for the plurality of switchable sections.

Furthermore, although the preferred embodiment described above has been explained with respect to a vehicle, the guidance signal generator system may be constituted as a human or pedestrian guidance system of a portable type.

Also, in response to the coded signals from the guidance information transmitter system, the guidance information which is available for the subscriber may be outputted in the form of either an artificially-composed acoustic presentation of particular messages or a visual presentation of particular characters. It is to be noted that, when the map information and the destination information are requested from a driver by a guidance information center a conversion program for converting the coded signals to a message or characters may be received at the center, together with the map information and the destination information.

We claim:

1. A road navigation system comprising:

a plurality of guidance information transmitter means disposed along a route, each transmitter means generating current location information in the form of extremely low powered signals so as to effect a transmission of said current location information within a relatively small area; and guidance signal generator means mounted on a vehicle for information for a driver, said guidance providing guidance signal generator means comprising:

receiver means for receiving said current location information from said guidance information transmitter means;

input means allowing said driver to input destination information;

memory means for storing available map information and the inputted destination information;

data processor means for comparing said map information and said destination information which have been stored in said memory means with said current location information when received, and for producing guidance information representative of route information to be traced from the current point to the destination; and output means for communicating said route information to said driver.

2. A road navigation system as set forth in claim 1, characterized by further including a guidance information control center having a means for storing said map information and means for communicating between said guidance signal generator means and said guidance information control center so that said route information can be produced by comparing both the current location information and the destination information, which are received from said guidance signal generator means through said communicating means, with the map information in said means for storing, and can be transmitted to said guidance signal generator means through said communicating means.

3. A road navigation system as set forth in claim 2 characterized in that said communicating means comprises a radio telephone system.

4. A road navigation system as set forth in claim 2 characterized in that said communicating means comprises a wired telephone system.

5. A road navigation system as set forth in claim 1, characterized in that said memory means comprises an IC card.

6. A road navigation system as set forth in claim 1 further including a guidance information control center responsive to destination information requested by the driver via a communication medium and map information stored thereat for generating route information sent via said communication medium to said guidance signal generator means to provide relevant guidance information.

7. A road navigation system as set forth in claim 6 wherein said communication medium comprises a radio telephone system.

8. A road navigation system as set forth in claim 6 wherein said communication medium comprises a wired telephone system.

* * * * *